US010764871B2

(12) United States Patent
Zeng et al.

(10) Patent No.: US 10,764,871 B2
(45) Date of Patent: Sep. 1, 2020

(54) EXTENSION OF DATA TRANSMISSION FROM ULRB TO ULCB

(71) Applicant: QUALCOMM Incorporated, San Diego, CA (US)

(72) Inventors: Wei Zeng, Cupertino, CA (US); Wanshi Chen, San Diego, CA (US); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 15/870,771

(22) Filed: Jan. 12, 2018

(65) Prior Publication Data
US 2018/0206229 A1 Jul. 19, 2018

Related U.S. Application Data

(60) Provisional application No. 62/446,813, filed on Jan. 16, 2017.

(51) Int. Cl.
H04W 72/04 (2009.01)
H04L 1/00 (2006.01)
(Continued)

(52) U.S. Cl.
CPC ......... H04W 72/0413 (2013.01); H04L 1/003 (2013.01); H04L 1/0009 (2013.01);
(Continued)

(58) Field of Classification Search
CPC .......... H04W 72/0048; H04W 72/048; H04W 72/0486; H04W 72/0413; H04L 1/0009; H04L 1/003; H04L 5/0048; H04B 7/0413
See application file for complete search history.

(56) References Cited

U.S. PATENT DOCUMENTS

2010/0080136 A1* 4/2010 Hunzinger ........... H04B 7/0404
370/252
2010/0177669 A1* 7/2010 Suo ....................... H04L 1/0027
370/280
(Continued)

OTHER PUBLICATIONS

International Search Report and Written Opinion—PCT/US2018/013858—ISA/EPO—dated Jun. 11, 2018 (171726WO).
(Continued)

Primary Examiner — Jenee Holland
(74) Attorney, Agent, or Firm — Arent Fox, LLP and Qualcomm, Incorporated

(57) ABSTRACT

At times a UE may have a data transmission that needs to extend beyond a resource grant in an ULRB portion of a slot. The UE may receive resource region reservation information from a base station and determine when to extend an UL transmission from the ULRB portion of a slot into the ULCB portion of the slot based resource region reservation information. The resource region reservation information may indicate ULCB resources which are reserved for PUCCH, PRACH, PUSCH, SRS, or other transmissions. The UE may determine to refrain from extending the data transmission into the ULCB when at least a portion of the data transmission would overlap reserved resources as indicated by the resource region reservation information.

30 Claims, 12 Drawing Sheets

(51) Int. Cl.
  *H04L 5/00*     (2006.01)
  *H04B 7/0413*    (2017.01)

(52) U.S. Cl.
  CPC ......... *H04L 5/0048* (2013.01); *H04W 72/048* (2013.01); *H04W 72/0446* (2013.01); *H04W 72/0486* (2013.01); *H04B 7/0413* (2013.01); *H04W 72/042* (2013.01)

(56) References Cited

U.S. PATENT DOCUMENTS

| | | | |
|---|---|---|---|
| 2011/0038348 A1* | 2/2011 | Borsella | G10H 1/361 370/331 |
| 2011/0053527 A1* | 3/2011 | Hunzinger | H04B 7/0404 455/101 |
| 2011/0143696 A1* | 6/2011 | Luo | H04B 7/0871 455/101 |
| 2011/0280202 A1 | 11/2011 | Lee et al. | |
| 2012/0014358 A1* | 1/2012 | Pan | H04W 72/0453 370/336 |
| 2013/0010722 A1* | 1/2013 | Suzuki | H04L 1/1854 370/329 |
| 2013/0121258 A1* | 5/2013 | Mukherjee | H04W 74/004 370/329 |
| 2013/0336226 A1* | 12/2013 | Noh | H04L 1/0026 370/328 |
| 2014/0016576 A1* | 1/2014 | Noh | H04W 52/362 370/329 |
| 2014/0098690 A1* | 4/2014 | Siomina | G01S 5/12 370/252 |
| 2014/0198773 A1* | 7/2014 | Yin | H04L 5/001 370/336 |
| 2014/0328329 A1* | 11/2014 | Novlan | H04W 72/042 370/336 |
| 2014/0334390 A1* | 11/2014 | Lindholm | H04L 5/0007 370/329 |
| 2015/0050938 A1 | 2/2015 | Uemura et al. | |
| 2015/0359000 A1* | 12/2015 | Li | H04W 74/06 370/329 |
| 2016/0278048 A1* | 9/2016 | Nory | H04W 16/14 |
| 2017/0048717 A1* | 2/2017 | Yoo | H04W 72/0453 |
| 2017/0223635 A1* | 8/2017 | Dinan | H04W 52/146 |
| 2017/0223675 A1* | 8/2017 | Dinan | H04W 72/042 |
| 2017/0318575 A1* | 11/2017 | Park | H04W 72/0413 |
| 2017/0366308 A1* | 12/2017 | Choi | H04L 1/1887 |
| 2017/0374679 A1* | 12/2017 | Park | H04L 5/00 |
| 2018/0227911 A1* | 8/2018 | Belghoul | H04W 74/006 |
| 2018/0270848 A1* | 9/2018 | Liang | H04W 72/04 |

OTHER PUBLICATIONS

Qualcomm Incorporated: "Candidate Frame Structures", 3GPP Draft; R1-164695, 3rd Generation Partnership Project (3GPP), Mobile Competence Centre; 650, Route des Lucioles; F-06921 Sophia-Antipolis Cedex; France, vol. RAN WG1, No. Nanjing, China; May 14, 2016, XP051089940, Retrieved from the Internet: URL:http://www.3gpp.org/ftp/tsg_ranWG1_RL1/TSGR1_85/Docs/ [retrieved on May 14, 2016], 8 pages.

Qualcomm Incorporated: "Common Short UL Burst for Delay Sensitive Control and Data", 3GPP Draft; R1-1612071, 3rd Generation Partnership Project (3GPP), Mobile Competence Centre; 650, Route des Lucioles; F-06921 Sophia-Antipolis Cedex; France, vol. RAN WG1, No. Reno, U.S.A; 20161114-20161118 Nov. 13, 2016, XP051176031, Retrieved from the Internet: URL:http://www.3gpp.org/ftp/Meetings_3GPP_SYNC/RAN1/Docs/ [retrieved on Nov. 13, 2016], 6 pages.

\* cited by examiner

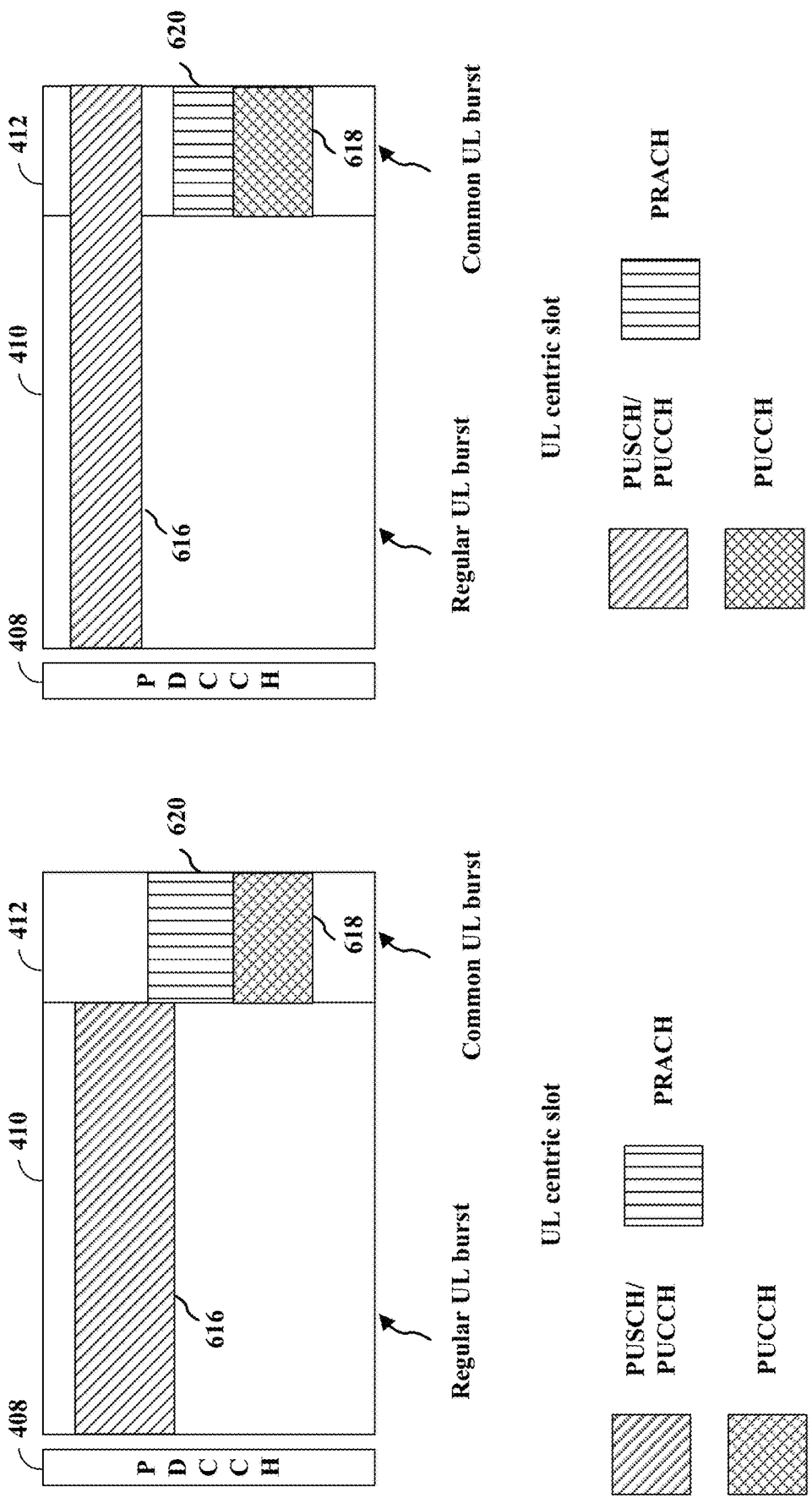

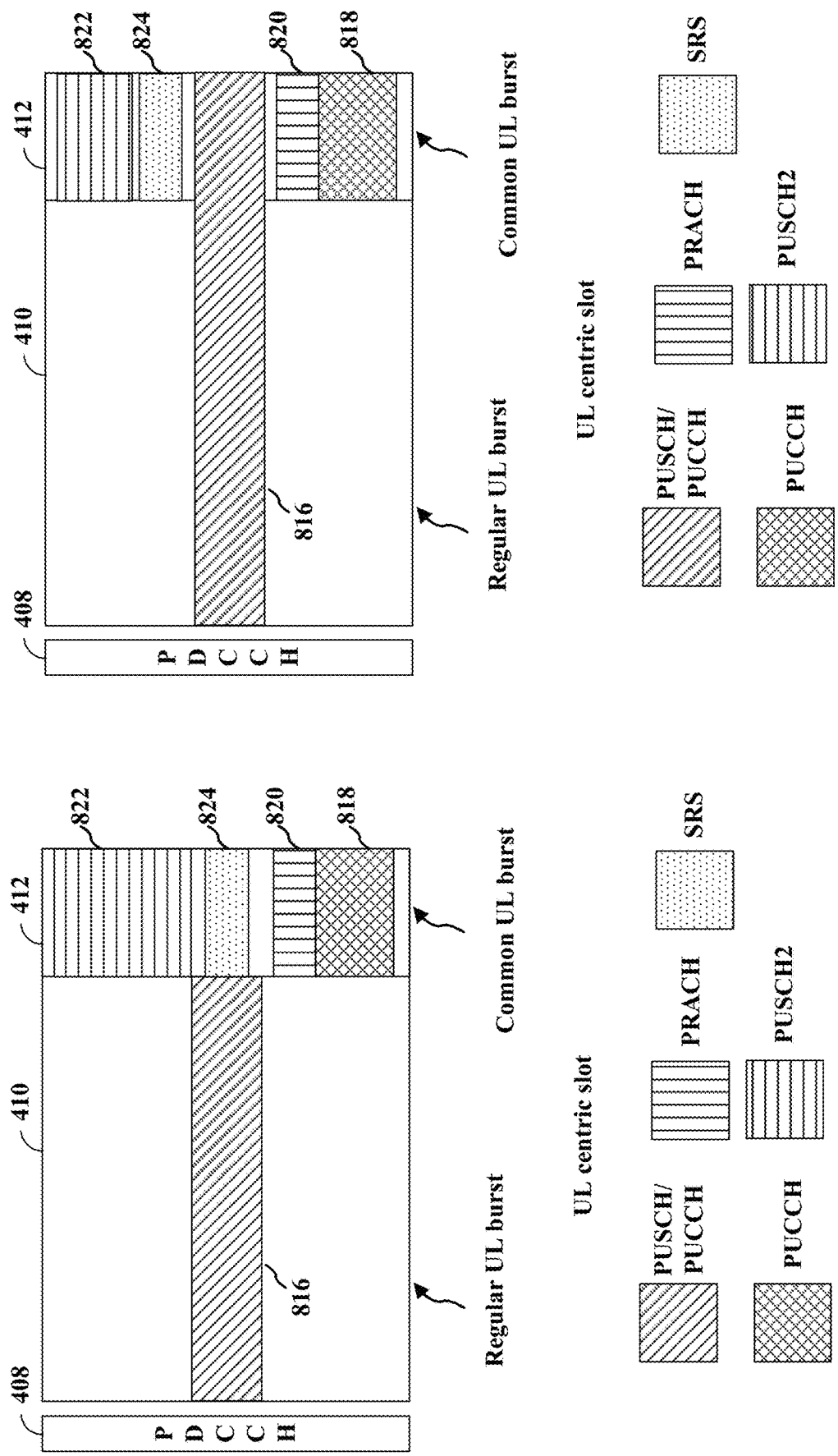

EXTENSION OF DATA TRANSMISSION FROM ULRB TO ULCB

CROSS-REFERENCE TO RELATED APPLICATION

This application claims the benefit of U.S. Provisional Application Ser. No. 62/446,813, entitled "Extension of Data Transmission From ULRB to ULCB" and filed on Jan. 16, 2017, which is expressly incorporated by reference herein in its entirety.

BACKGROUND

Field

The present disclosure relates generally to communication systems, and more particularly, to extension of uplink (UL) transmissions from an UL regular burst (ULRB) portion of a slot to an UL common burst (ULCB) portion of a slot.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. In another example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G/NR communications technology and beyond may be desired. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An UL centric slot may comprise a UL common burst (ULCB) region in addition to an UL regular burst (ULRB) region. Data transmissions, such as Physical Uplink Shared Channel (PUSCH) and Physical Uplink Control Channel (PUCCH) transmissions, among others, may be transmitted in the ULRB. The ULCB may allow for the transmission of UL control transmissions, time critical transmissions, and other important UL transmissions, e.g., PUCCH, PRACH, and SRS. At times a UE may have a data transmission that cannot be transmitted wholly within a resource grant in the ULRB portion of the slot. It may be beneficial to the UE to be able to use resources in the ULCB portion of the slot. However, such a data transmission extending from the ULRB to the ULCB portion of the slot may interfere with another transmission in the ULCB portion of the slot. While a base station may provide the UE with an additional resource grant for the ULCB, this additional grant requires additional complexity at the base station and the use of additional resources in order to communicate the grant from the base station to the UE. If a UE is provided a second grant, the UE may use this second grant to begin a second transmission of the additional UL data according to the second grant in the ULCB portion of the slot.

Aspects presented herein enable a UE to transmit an UL transmission in the ULCB portion of the slot without the additional complexity required by a second grant. Instead, the present application provides for the UE to determine when to extend an UL transmission from the ULRB portion of the slot into the ULCB portion of the slot. The determination may be based on the UE's knowledge of a resource region reservation in the ULCB portion of the slot and/or whether the extension of the UL data transmission would overlap with the resource region reservation. The determination may also be based on signaling from the base station that indicates whether the UE is able to extend the transmission from the ULRB portion of the slot to the ULCB portion of the slot.

In an aspect of the disclosure, a method, a computer-readable medium, and an apparatus are provided. The apparatus obtains resource region reservation information for an ULCB portion of a slot, determines a need to transmit data for a data transmission beyond a grant of resources in a ULRB portion of the slot, and determines whether to extend the data transmission into the ULCB portion based on the resource region reservation information. The apparatus sends the data transmission in the slot based on a result of the determining. The apparatus may determine to refrain from extending the data transmission into the ULCB when at least one resource block of the data transmission would overlap a resource block indicated by the obtained resource region reservation information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A and 6B illustrate an example slot structure for an UL centric slot in accordance with aspects presented herein.

FIGS. 8A and 8B illustrate an example slot structure for an UL centric slot in accordance with aspects presented herein.

DETAILED DESCRIPTION

Figure 1:
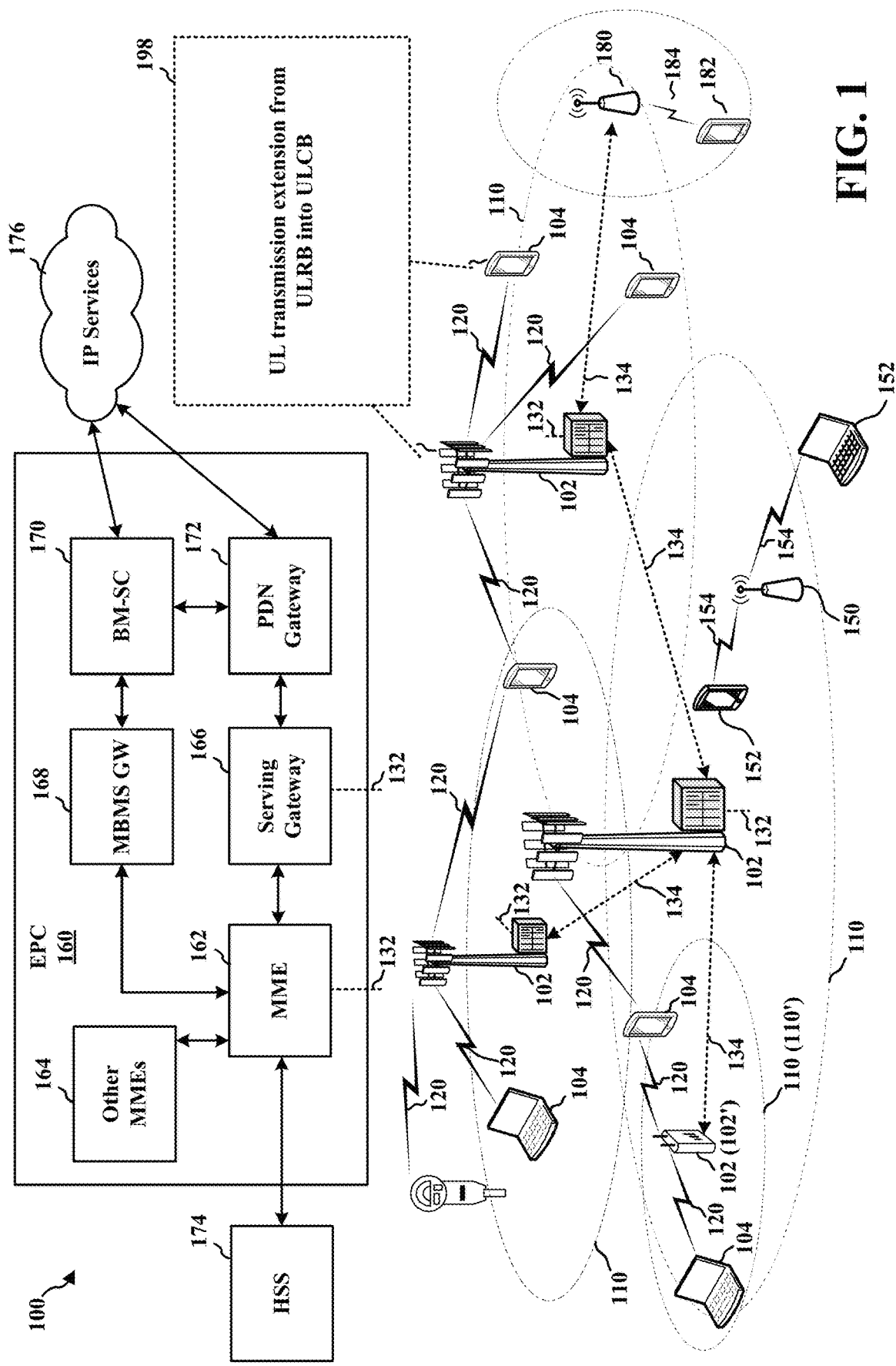
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The geographic coverage area 110 for a base station 102 may be divided into sectors or cells making up only a portion of the coverage area (not shown). The wireless communication network 100 may include base stations 1052 of different types (e.g., macro base stations or small cell base stations, described above). Additionally, the plurality of base stations 102 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 110 for different communication technologies.

The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), a gNB, an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. Additionally, a UE 104 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and base station 102, 180 may communicate including an uplink transmission 198 that extends from an ULRB to an ULCB of a slot, as described in connection with FIGS. 4-12.

For example, the UE 104 may determine whether or not to extend a PUSCH from an uplink regular burst region into an uplink common burst region of an UL slot.

Figure 2:
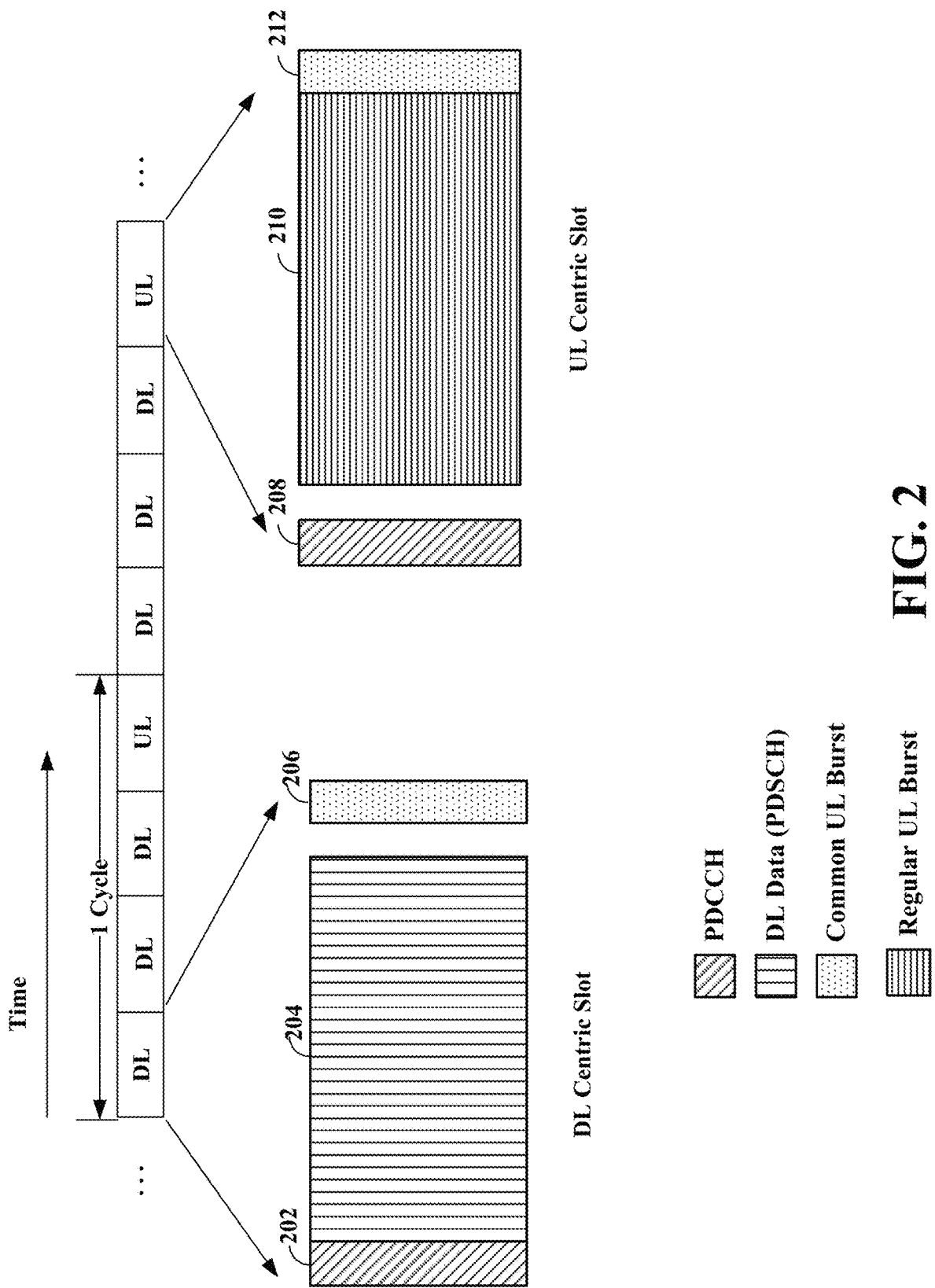
FIG. 2 illustrates an example slot structure for UL centric slots and DL centric slots, in accordance with aspects presented herein.

FIG. 2 illustrates an example slot structure comprising DL centric slots and UL centric slots. In 5G/NR, a slot may have a duration of 0.5 ms, 0.25 ms, etc., and each slot may have 7 or 14 symbols. A resource grid may be used to represent the time slots, each time slot including one or more time concurrent resource blocks (RBs) (also referred to as physical RBs (PRBs)). The resource blocks for the resource grid may be further divided into multiple resource elements (REs). The number of bits carried by each RE depends on the modulation scheme.

A slot may be DL only or UL only, and may also be DL centric or UL centric. FIG. 2 illustrates an example DL centric slot. The DL centric slot may comprise a DL control region 202, e.g., in which in which physical downlink control channel (PDCCH) is transmitted. Some of the REs of the DL centric slot may carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS).

A physical broadcast channel (PBCH) may carry a master information block (MIB). The MIB provides a number of RBs in the DL system bandwidth, a PHICH configuration, and a system frame number (SFN). The DL centric slot may comprise a DL data region 204, e.g., in which a physical downlink shared channel (PDSCH) carries user data, broadcast system information not transmitted through the PBCH such as system information blocks (SIBs), and paging messages.

The DL centric slot may also comprise a common UL burst region (ULCB) 206 in which UEs may send UL control channel information or other time sensitive or otherwise critical UL transmissions.

For example, the UE may additionally transmit sounding reference signals (SRS). The SRS may be used by a base station for channel quality estimation to enable frequency-dependent scheduling on the UL. A physical random access channel (PRACH) may be included within one or more slots within a slot structure based on the PRACH configuration. The PRACH allows the UE to perform initial system access and achieve UL synchronization. Additionally, the common UL burst 206 may comprise a physical uplink control channel (PUCCH) that carries uplink control information (UCI), such as scheduling requests, a channel quality indicator (CQI), a precoding matrix indicator (PMI), a rank indicator (RI), and HARQ ACK/NACK feedback.

Similar to the DL centric slot, the UL centric slot may comprise a DL control region 208, e.g., for PDCCH transmissions. The DL control region 202, 208 may comprise a limited number of symbols at the beginning of a slot. The UL centric slot may comprise an UL data region 210, e.g., for the transmission of a Physical Uplink Shared Channel (PUSCH) that carries data, and may additionally be used to carry a buffer status report (BSR), a power headroom report (PHR), and/or UCI. The UL data region 210 may be referred to as a UL regular burst (ULRB) region. The UL centric slot may also comprise a common UL burst region (ULCB) 212 similar to that of the DL based slot 206.

The UL centric slot may comprise a guard band between the UL data region 210 and the ULCB 212. For example, the guard band may be based on the base station's capabilities and used to reduce interference when the UL data region 210 and the ULCB have different numerologies (symbol periods, slot lengths, etc.). The DL control region 202, 208 may comprise a limited number of symbols at the beginning of a slot and the ULCB region may comprise one or two symbols at the end of the slot, for both the DL centric and the UL centric slots. Resource management of PUSCH or PUCCH transmissions in the ULRB may be similar to that PUSCH or PUCCH for LTE. However, where LTE may be primarily driven by a SC-FDM waveform, SGNR may be based on an SC-FDM or OFDM waveform in the ULRB 210.

Figure 3:
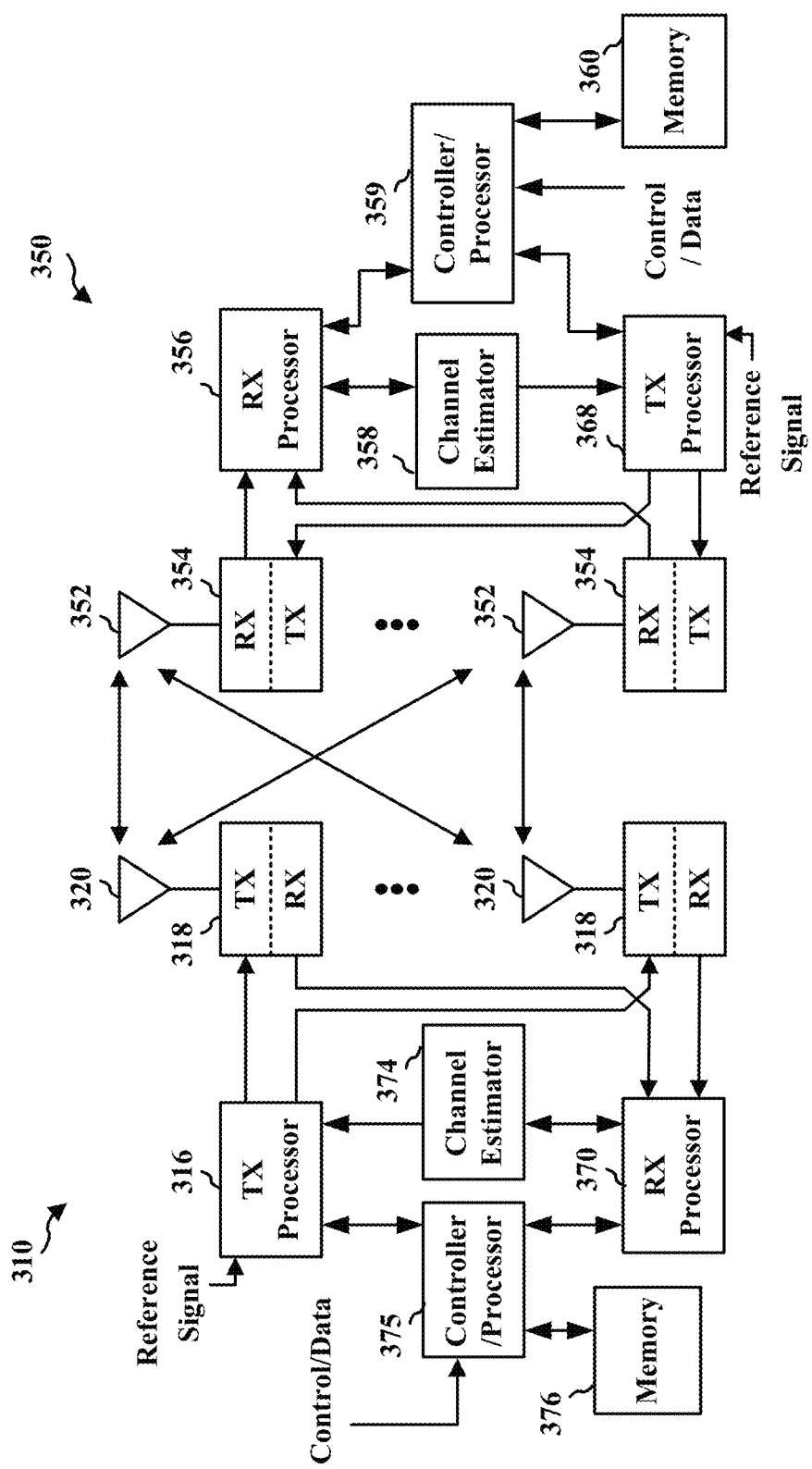
FIG. 3 is a diagram illustrating an example of a base station and user equipment (UE) in an access network.

FIG. 3 is a block diagram of an base station 310 (e.g., eNB, gNB, etc.) in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As illustrated in FIG. 2, an UL centric slot may comprise a ULCB region 212 in addition to an ULRB region 210. Data transmissions, such as PUSCH transmissions, may be transmitted in the ULRB 210 portion of the slot. The ULCB portion of the slot may allow for the transmission of UL control transmissions, time critical transmissions, and other important UL transmissions, including among others PUCCH, PRACH, and SRS. The ULCB portion of the slot may be provided for one or more UEs. At times it may be beneficial to use the ULCB portion of the slot for PUSCH. This may allow for rate matching PUSCH or PUCCH in the ULRB based on whether or not the UE may use the ULCB portion of the slot. It can be important to avoid or minimize transmissions between PUSCH or PUCCH originated in the ULRB portion of the slot from overlapping with other UL transmissions in the ULCB portion of the slot.

Additionally, the ULCB 212 portion of the slot may be channelized. For example, the ULCB 212 portion of the slot may comprise a channel for PUCCH for one or more UEs. The PUCCH among different UEs may be time division multiplexed (TDM), frequency division multiplexed (FDM), or code division multiplexed (CDM). A UE not involved in PUCCH transmissions originating in the ULCB portion of the slot might not be aware of other UE's PUCCH transmissions in the ULCB portion of the slot. Another example channel in an ULCB may be a PUSCH. Thus, the ULCB portion of the slot may comprise PUSCH for one or more UEs. The ULCB portion of the slot may also comprise a PRACH for one or more UEs. The ULCB portion of the slot may comprise a channel for SRS. An SRS transmission can be narrowband or wideband. An SRS transmission may span within a subband/resource set or across multiple subbands/resource sets. In one example, a subband may be specified or configured on a per UE basis, within the entire UL bandwidth, e.g., a 100 MHz UL bandwidth may be divided into 10 subbands, each being 10 MHz.

Figure 4:
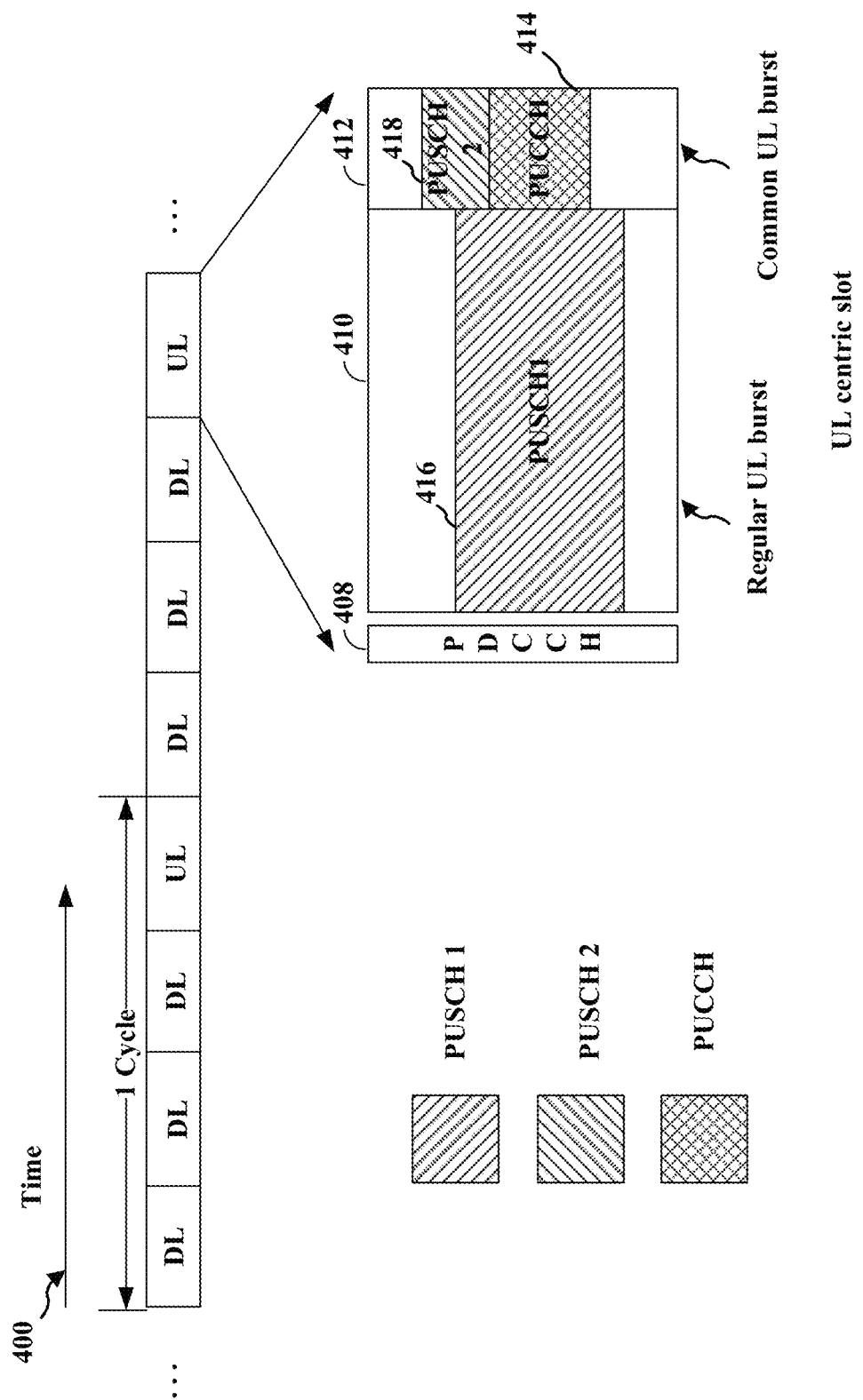
FIG. 4 illustrates an example slot structure for an UL centric slot in accordance with aspects presented herein.

Within the ULCB portion of the slot, a resource pool may be defined for UL control transmissions for a particular cell. For example, a set of, e.g., 100 RBs within the ULCB portion of the slot may be reserved for PUCCH or PRACH transmission from UEs of a same cell. This is only an example, and the reserved number of RBs may be any appropriate number. Additionally, the reservation may be for a group of cells rather than just one cell. FIG. 4 illustrates an example PUCCH 414 in an ULCB portion 412 of the slot. Resources reserved for PUCCH 414 may represent a resource pool that is reserved within the ULCB portion 412 of the slot for PUCCH transmissions from UEs in a particular cell or group of cells. As a result of such PUCCH/PRACH reservations, it might not be sufficient to consider rate matching on a per user basis using a PUCCH specific to one UE.

FIG. 4 illustrates an example in which a UE may transmit UL data in ULCB portion 412 of the slot. For example, a UE may have additional data to transmit that would extend beyond its PUSCH grant 416, e.g., PUSCH1, in ULRB 410. The UE may have received a grant for PUSCH1 416, in PDCCH 408. The UE may receive a separate grant from the base station allowing it to transmit in the ULCB portion 412 of the UL centric slot, e.g., for PUSCH2 418 in ULCB portion 412. Although this example is described for a single UE, PUSCH1 416 may be for a first UE and PUSCH2 418 in ULCB portion 412 of the slot may be for a different UE. The UE is not able to extend the transmission of PUSCH1 from the ULRB portion of the slot into the ULCB portion 412 of the slot. Instead, the UE must receive a separate grant. The separate grant requires added complexity at the base station, which is required to configure an additional grant, e.g., PUSCH2, 418 for transmission in the ULCB portion 412 of the slot. Both the grant for PUSCH1 416 and the grant for PUSCH2 418 must be independently scheduled.

Aspects presented herein enable a UE to transmit an UL transmission in ULCB portion 412 of the slot without the additional complexity required for the base station to issue a second grant. Instead, a way is provided for the UE to determine, without an additional grant, whether to extend an UL transmission from the ULRB portion 410 of the slot into the ULCB portion 412 of the slot. The determination may be based on the UE's knowledge of a resource region reservation in the ULCB and whether the extension of the UL data transmission would overlap with the resource region reservation. The UE may make the determination autonomously, e.g., without specific direction from the base station. For example, the UE may determine whether to extend a PUSCH or PUCCH transmission that originated in the ULRB portion 410 to the ULCB portion 412 when the UE determines that the PUSCH or PUCCH transmission would not overlap another resource region reservation in the ULCB portion 412.

Figure 5:
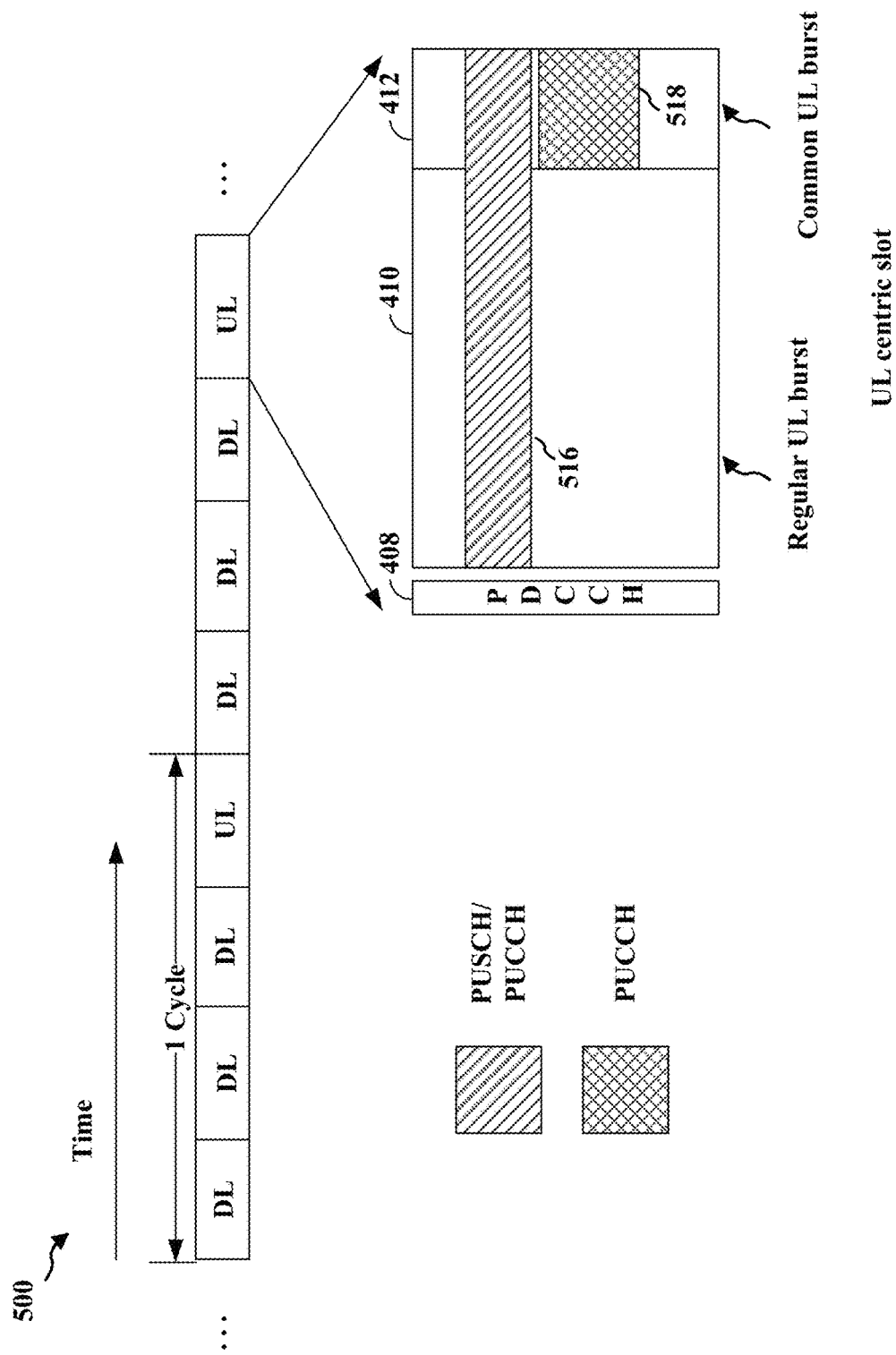
FIG. 5 illustrates an example slot structure for an UL centric slot in accordance with aspects presented herein.

The resource region may comprise a common resource region reserved for PUCCH in ULCB. The PUCCH region 414 in FIG. 4 is an example PUCCH region that may be reserved for UEs in a cell or a group of cells. In FIG. 4, the UE may determine not to extend PUSCH1 into ULCB 412 because PUSCH1 would overlap the reserved region PUCCH 414 in ULCB 412. Therefore, the UE would refrain from extending the transmission of PUSCH1 into ULCB 412. FIG. 5 illustrates an example 500 in which the UE may determine to extend PUSCH/PUCCH 516 into the ULCB portion 412 because the PUSCH would not overlap the PUCCH reserved portion 518 of ULCB 412.

In a second example, the resource reservation region may comprise a common resource region reserved for PRACH in ULCB 412. If the UE determines that extending a PUSCH or PUCCH transmission that originated in ULRB into ULCB would not overlap the resource region reserved for PRACH, the UE may determine to extend the PUSCH/PUCCH transmission. If the UE detected a potential overlap, the UE may refrain from extending the PUSCH/PUCCH transmission into the ULCB 412. For example, in FIG. 6A, the UE may determine not to extend PUSCH/PUCCH 616 into ULCB 412 even though the PUSCH/PUCCH 616 would not overlap PUCCH reserved region 618, but because the PUSCH/PUCCH 616 would overlap the PRACH reserved region 620. In FIG. 6B, the UE may determine to extend PUSCH/PUCCH 616 into ULCB because the PUSCH/PUCCH 616 would not overlap the PRACH reserved region 620, e.g., in addition to not overlapping the PUCCH reserved region 618.

The PUCCH reserved region and/or the PRACH reserved region in the ULCB may be obtained by the UE in a semi-static configuration from the base station.

Figure 7B:
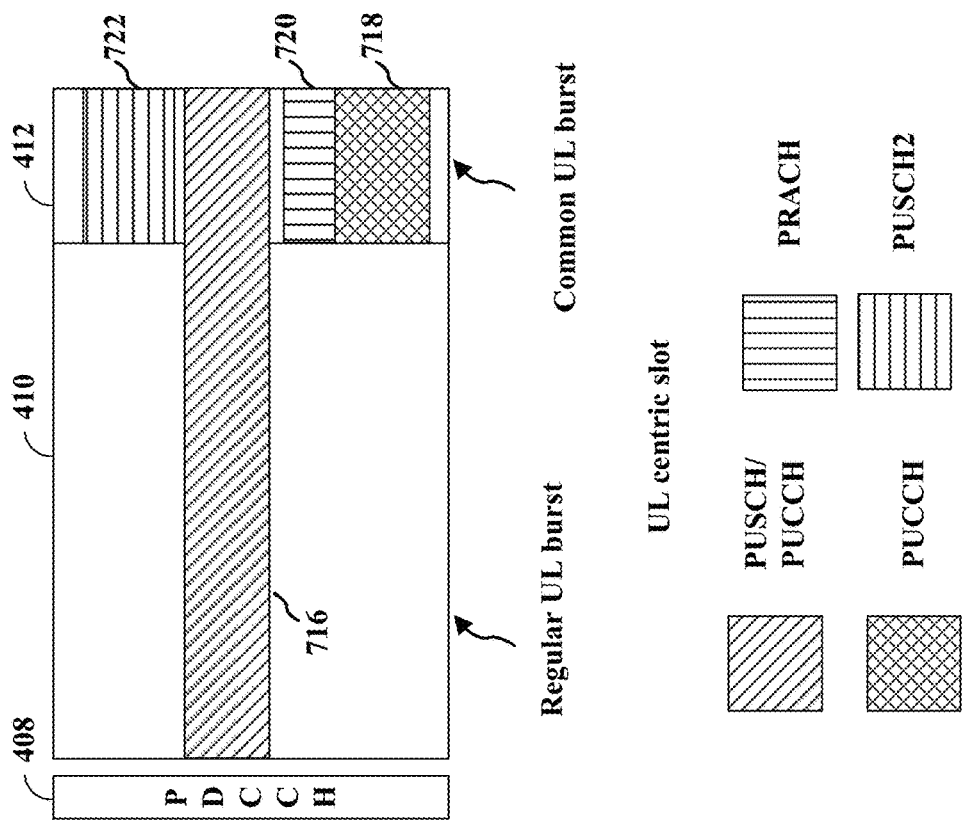
FIGS. 7A and 7B illustrate an example slot structure for an UL centric slot in accordance with aspects presented herein.
Figure 7A:
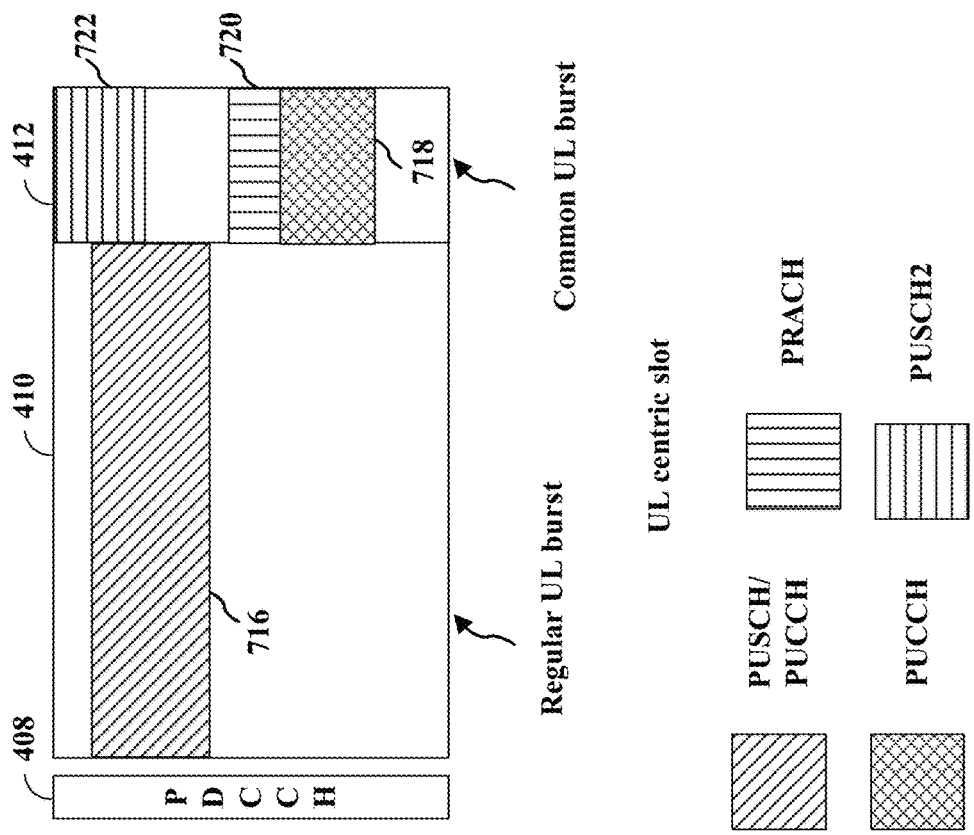

In a third example, the resource region may comprise a potential resource region reserved for PUSCH in ULCB 412 which may, for example, vary from slot to slot. In one such case, the UE may consider whether extending the PUSCH/PUCCH that originated in ULRB 410 would overlap a region reserved for a PUSCH of another UE. For example, in FIG. 7A, the UE may determine not to extend PUSCH/PUCCH 716 into ULCB 412 even though the PUSCH/PUCCH 716 would not overlap PUCCH reserved region 718 or PRACH reserved region 720, but because the PUSCH/PUCCH 716 would overlap a PUSCH reserved region 722 for another UE. In FIG. 7B, the UE may determine to extend PUSCH/PUCCH 716 into ULCB 412 because the PUSCH/PUCCH 716 would not overlap PUSCH reserved region 722 for another UE, e.g., in addition to not overlapping the PUCCH reserved region 718 or the PRACH reserved region 720. This usage of the ULCB portion 412 may vary dynamically and the reservations applicable to a particular slot may be signaled to a UE in the control region; for example, an indication of reservation/availability may be included with the DCI for the UE.

In a fourth example, the resource region may comprise a potential resource region reserved for SRS in ULCB 412. For example, the UE may consider whether extending an UL transmission that originated in ULRB 410 would overlap a region reserved for a SRS of another UE. If extending the UL transmission from ULRB into ULCB 412 would overlap such an SRS reservation for another UE, the UE may refrain from extending the UL transmission from ULRB 410 into ULCB 412. If the UE determines that no overlap would occur, the UE may extend the UL transmission from ULRB into ULCB 412. For example, in FIG. 8A, the UE may determine not to extend PUSCH/PUCCH 816 into ULCB 412 even though the PUSCH/PUCCH 816 would not overlap PUCCH reserved region 818, PRACH reserved region 820, or PUSCH reserved region 822 for another UE, because the PUSCH 816 would overlap the SRS reserved region 824. In FIG. 8B, the UE may determine to extend PUSCH/PUCCH 816 into ULCB 412 because the PUSCH/PUCCH 816 would not overlap the SRS reserved region 824, e.g., in addition to not overlapping the PUCCH reserved region 818, the PRACH reserved region 820, or PUSCH reserved region 822 for another UE. As with reservation of the ULCB portion 412 for PUSCH transmissions, SRS reservations may also change from time to time and may be signaled to the UE by an indication that is different from the semi-static signaling described in connection with the PUCCH and/or PRACH examples above.

In general, PUSCH reserved region and/or the SRS reserved region in the ULCB may be received by the UE in an indication from the base station. The indication may be a dynamic indication through DCI or a semi-static configuration.

In a fifth example, the resource region reservation may comprise a guard band offset. The numerology in the ULRB 410 may be different than that of ULCB 412. For example, a 15 KHz tone spacing might be used for symbols in ULRB 410, but a 30 KHz tone spacing may be used for symbols in ULCB 412. As a result, if PUSCH or PUCCH originated in the ULRB 410 extend into the ULCB, the extended transmission may cause inter carrier interference, even though it is not overlapping any other channels or signals in the ULCB 412 due to the different numerologies. Different base stations may have different processing and interference management capabilities. For example, some base stations may be able to manage interference due to different numerologies, even if the transmissions of different numerologies are close to each other in frequency. Other base stations may rely on a guard band between transmissions of different numerologies in order to handle the mutual interference. Therefore, a UE may need to take into consideration the capabilities of the base station or the need for a guard band at the base station. For example, the UE may consider whether extending a PUSCH/PUCCH originated in ULRB into ULCB would overlap a guard band offset. If the extension of PUSCH/PUCCH from the ULRB to the ULCB portion of a slot would overlap the guard band offset, the UE may refrain from extending its transmission. If no overlap would occur, the UE may extend the PUSCH/PUCCH transmission into the ULCB.

The UE may determine whether an overlap would occur for any of these example resource region reservations. For example, the UE may refrain from extending an UL transmission originating in ULRB into ULCB when it determines that the extended transmission would overlap a resource region reserved in the ULCB for any of PUCCH, PRACH, PUSCH of another UE, SRS of another UE, and a guard band offset. The UE may determine to extend the UL transmission into the ULCB only when the UE determines that the extended transmission would not overlap any resource region reserved in the ULCB for any of PUCCH, PRACH, PUSCH of another UE, SRS of another UE, and a guard band offset.

The common resource region reserved for PUCCH or PRACH may be a semi-static reservation that the base station does not need to transmit to the UE for each ULCB. The UE may obtain the common resource region reservation for PUCCH or PRACH in a prior transmission from the base station such as through RRC signaling. The potential resource regions for PUSCH or SRS for other UEs may be changed dynamically by the base station. Therefore, the base station may transmit a further indication to the UE regarding PUSCH/SRS reservations in the ULCB.

The guard band may be may be signaled to the UE from the base station. The guard-band offset may depend on base station capability and/or whether the base station is intended to operate with different numerologies in ULCB than in ULRB. The guard band offset may have a default value. For example, a default guard band may be 0 RB. Therefore, unless signaled, a UE may assume that the default guard band value is applicable. The guard band offset may be configurable, either cell-specifically or UE-specifically. The guard band offset may be a function of different combinations of numerologies. The offset may be a function of different channels. For example, a first guard band offset may apply for PUSCH and a second guard band offset may apply for PUCCH.

The base station may signal a certain bandwidth of ULCB to the UE as well as signal a guard band offset to the UE. The UE may then extend ULRB into the ULCB when the RBs of the PUSCH are not within the signaled ULCB bandwidth and the guard band offset. Therefore, the determination regarding whether to extend the PUSCH/PUCCH from the ULRB into the ULCB may be made by the UE based on information that the UE receives from the base station.

In a second option, the base station may directly signal the UE that the UE may extend the UL transmission from ULRB into the ULCB. In this example, the UE may refrain from extending an UL transmission originated in ULRB into the ULCB unless it receives explicit signaling from the base station allowing it to extend the UL transmission from ULRB into ULCB.

The resource reservation regions may be cell specific. In another example, the resource reservation regions may be UE specific.

Figure 9:
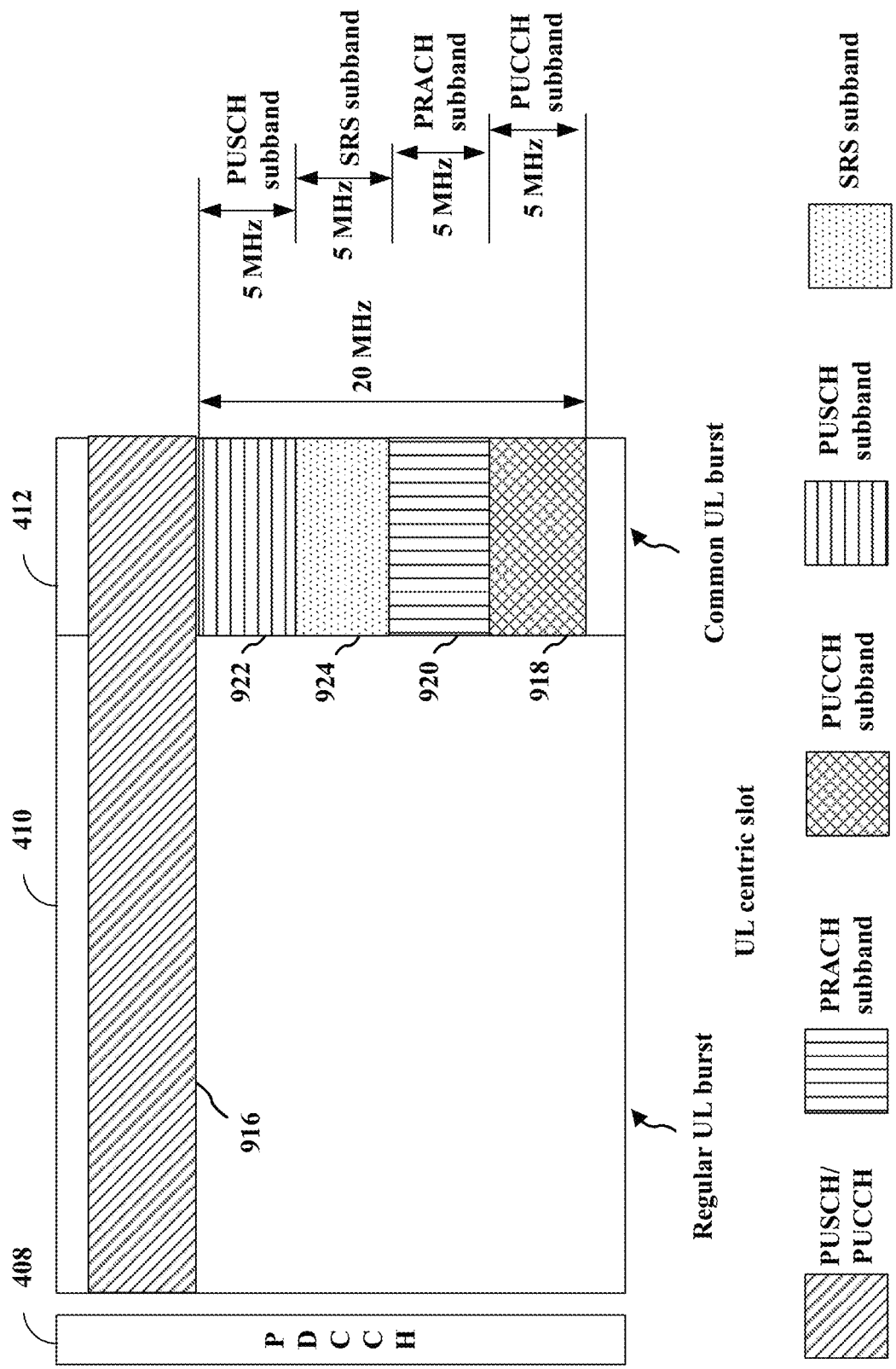
FIG. 9 illustrates an example slot structure for an UL centric slot in accordance with aspects presented herein.

The resource reservation regions may be aggregated into one or more subbands. For example, at least a portion of the UL bandwidth of the ULCB may be segregated into a set of subbands. A subband may be designated for any of PUCCH in the ULCB, PRACH in the ULCB, PUSCH in the ULCB, SRS in the ULCB, and a guard band in the ULCB. Thus, the reservation may be for the entire subband rather than for a set of RBs within the subband. The UE may then make the determination regarding whether to extend a PUSCH/PUCCH transmission 916 from ULRB into CLRB based on the subband of the PUSCH transmission. FIG. 9 illustrates an example of an ULCB having a 20 MHz portion that is separated into four 5 MHz subbands, including a PUCCH subband 918, a PRACH subband 920, a PUSCH subband 922, and an SRS subband 924. In the example in FIG. 9, the UE may determine to extend PUSCH/PUCCH 916 from ULRB 410 to ULCB 412 because the PUSCH/PUCCH 916 would not overlap any of the subbands 918, 920, 922, 924. If instead, PUSCH/PUCCH 916 from ULRB would overlap one of subbands 918, 920, 922, or 924, the UE would refrain from extending PUSCH/PUCCH 916 into ULCB 412 and may rate match its UL transmission in view of the additional ULCB resources.

Figure 10:
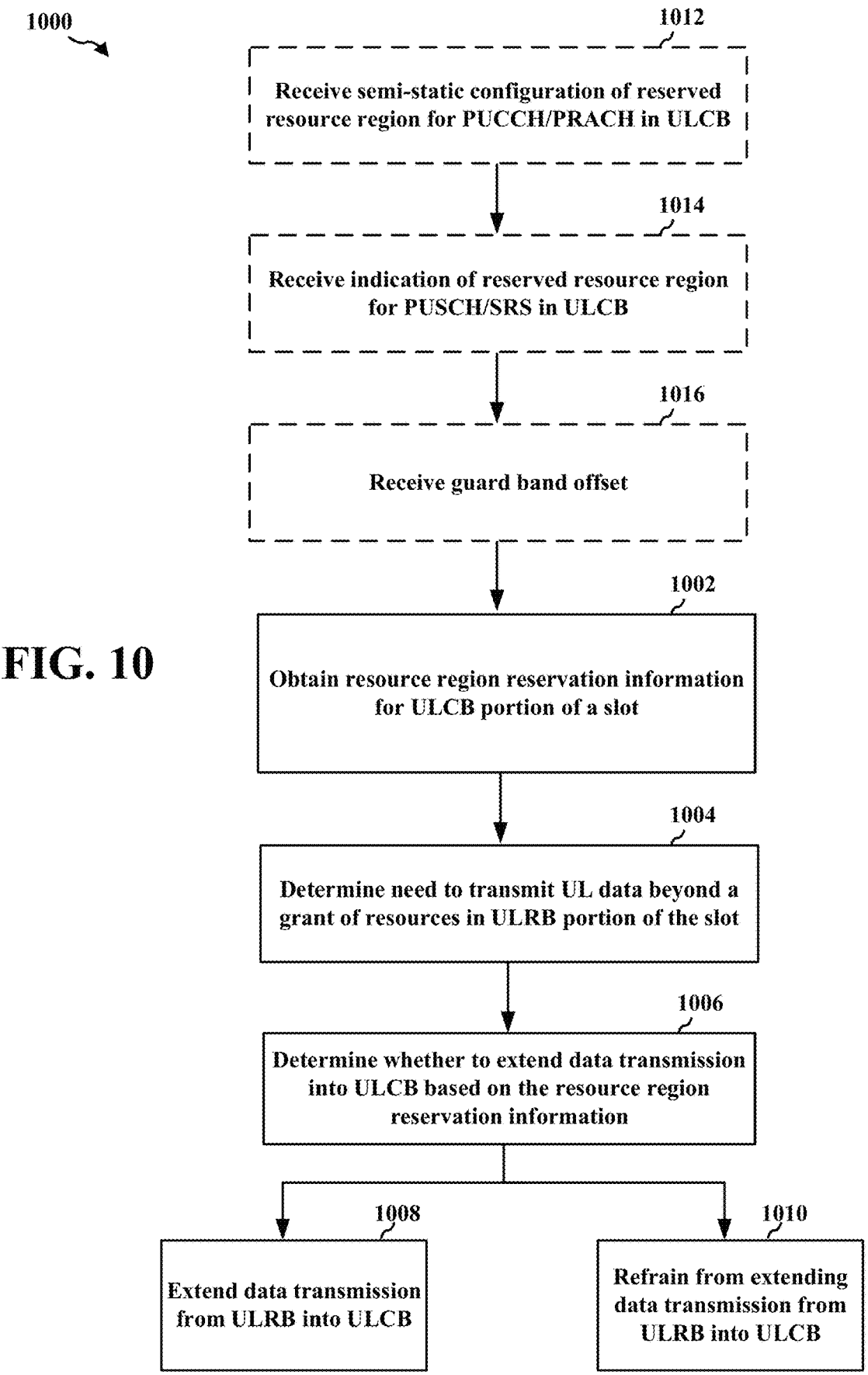
FIG. 10 is a flowchart of a method of wireless communication.

FIG. 10 is a flowchart 1000 of a method of wireless communication. The method may be performed by a UE (e.g., the UE 104, 350, the apparatus 1102/1102') communicating with an base station (e.g., base station 102, 150, 180, 310, 1150). At 1002, the UE obtains resource region reservation information for an ULCB uplink portion of a slot, such as ULCB 412 in FIGS. 4-9. The UE may obtain this information from the base station.

In one example, obtaining the resource region reservation at 1002 may comprise identifying a common resource region reserved for a PUCCH or a PRACH in the ULCB. For example, at 1012, the UE may receive a semi-static configuration of the reserved resource region, the configuration indicates at least one of a PUCCH in the ULCB and a PRACH in the ULCB. Then, the determination at 1006 of whether to extend the data transmission into the ULCB portion based may be based on received the semi-static configuration.

In another example, obtaining the resource region reservation at 1002 may comprise receiving a transmission from an base station indicating a PUSCH region or an SRS region reserved in the ULCB. For example, at 1014, the UE may receive an indication for an ULCB resource reserved for at least one of a PUSCH and an SRS region or a particular slot. Then, the determination at 1006 may be based on the received indication.

The resource region reservation obtained at 1002 may identify a subband/resource set comprising at least one reserved resource block, as described in connection with FIG. 9.

The resource region reservation obtained at 1002 for the ULCB may be cell specific. In another example, the resource region reservation for the ULCB at 1002 may be UE specific.

At 1004, the UE determines a need to transmit data for a data transmission beyond a grant of resources in an ULRB portion of the slot, e.g., 410 of FIGS. 4-9. For example, the UE may determine that data for an UL transmission, such as PUSCH/PUCCH 416, 516, 616, 716, 816, 916, includes additional data that would extend beyond the UL grant in ULRB 410.

At 1006, the UE determines whether to extend the data transmission into the ULCB portion based on the resource region reservation information. For example, the UE may determine to refrain from extending the data transmission into the ULCB when at least a portion of the extended data transmission would overlap reserved resources as indicated in the obtained resource region reservation in the ULCB portion of the slot. For example, the UE may determine to refrain from extending the data transmission into the ULCB when at least one resource block of the extended data transmission would overlap a resource block of the obtained resource region reservation in the ULCB portion of the slot, e.g., as described in connection with FIGS. 4, 6A, 7A, 8A, and 9. Thus, based on the determination at 1006, the UE may refrain from extending the data transmission from the ULRB portion of the slot into the ULCB portion of the slot at 1010. When the data transmission would not overlap a resource block of the obtained resource region reservation in the ULCB portion of the slot, the UE may determine at 1006 to extend the data transmission into the ULCB portion of the slot, e.g., as described in connection with FIGS. 5, 6B, 7B, 8B, and 9. Then, at 1008, the UE may extend the data transmission from the ULRB portion of the slot to the ULCB portion of the slot and, for example, perform UL rate matching based on the combined ULRB and ULCB resources. Thus, at 1008 or 1010, the UE may send the data transmission in the slot based on a result of the determining at 1006, e.g., by sending the data transmission extended from the ULRB to the ULCB at 1008 or by refraining from sending the data transmission in the ULCB at 1010 based on the determination at 1006.

The determination at 1006 may be made by the UE in order to avoid overlaps based on reservation information that it receives from the base station. Alternately, the UE may rely on explicit signaling from the base station indicating that the UE may extend the data transmission into the ULCB.

The UE may further receive a guard band offset at 1016. The UE may determine whether to extend the data transmission into the ULCB at 1006 further based on the guard band offset.

The UE may also determine to refrain from extending the data transmission into the ULCB at 1006 when a ULRB numerology for the ULRB portion of the slot differs from a ULCB numerology for the ULCB portion of the slot.

Figure 11:
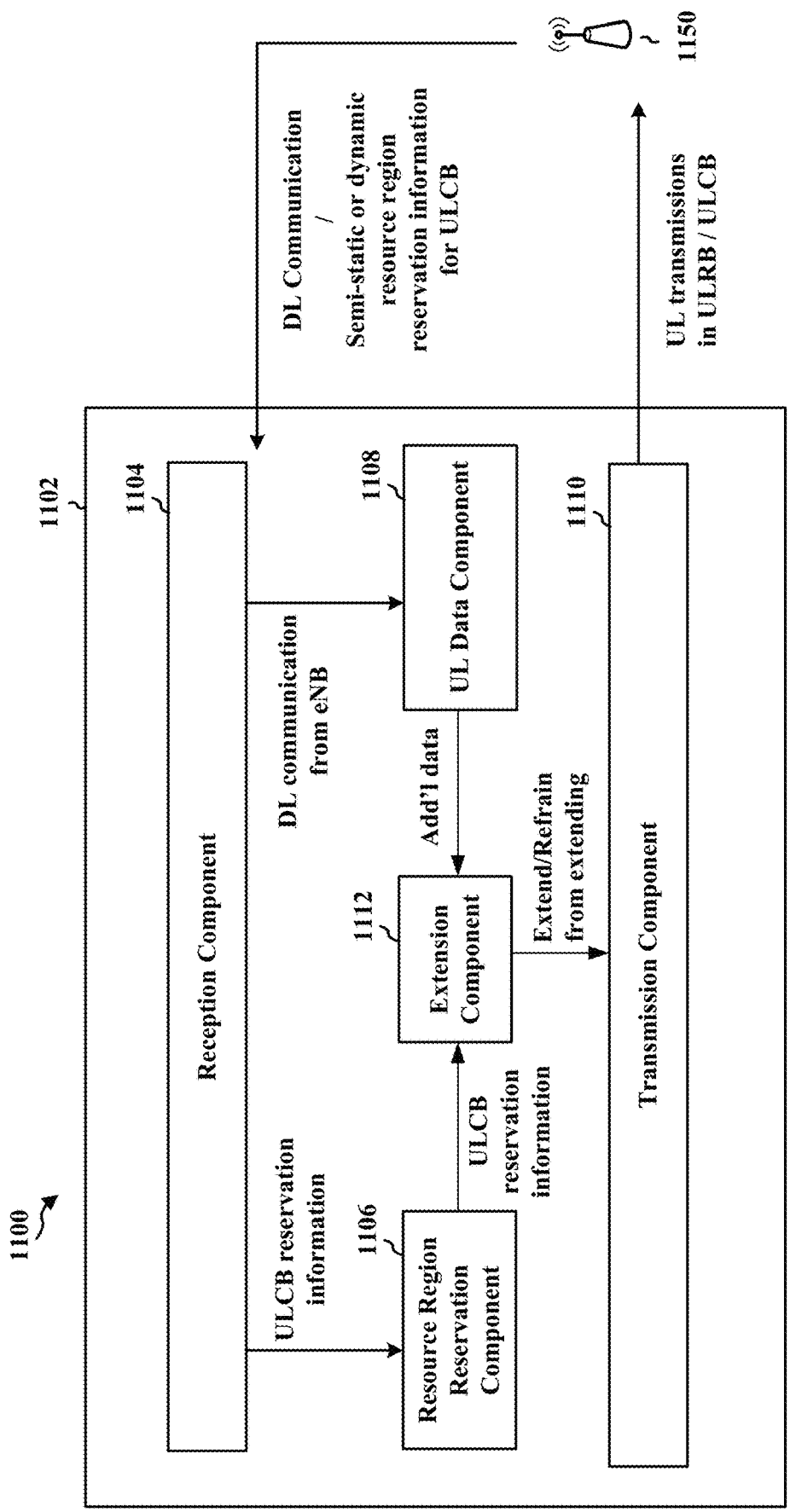
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE as described hereinbefore. The apparatus includes a component reception 1104 that receives DL communication from base station 1150, including semi-static or dynamic indications of resource region reservation information for an ULCB portion of a slot. The resource region reservation information may comprise any of reservations corresponding to PUCCH, PRACH, PUSCH, RSR, guard band, etc., as described in connection with FIGS. 4-9. The apparatus includes a resource region reservation component 1106 that obtains resource region reservation information for the ULCB portion of a slot and an UL data component 1108 that determines a need at the apparatus to transmit UL data for a data transmission beyond a grant of resources in a ULRB portion of the slot. The resource region reservation component 1106 and the UL data component 1108 may provide information to an extension component 1112 that determines whether to extend the data transmission from ULRB into the ULCB portion of a frame based on the resource region reservation information. The extension component 1112 may then instruct transmission component 1110 to extend the data transmission into the ULCB portion of the slot or to refrain from transmitting the data transmission in the ULCB portion of the slot. The transmission component 1110 transmits UL data to the base station, during ULRB and/or ULCB according to the determination made at the extension component 1112. Thus, the transmission component 1110 sends the data transmission in the slot based on a result of the determining at the extension component 1112.

The apparatus may include additional components that perform each of the blocks of the algorithm in the aforementioned flowchart of FIG. 10 and the aspects of FIGS. 4-9. As such, each block in the aforementioned flowchart of FIG. 10 and the aspects of FIGS. 4-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
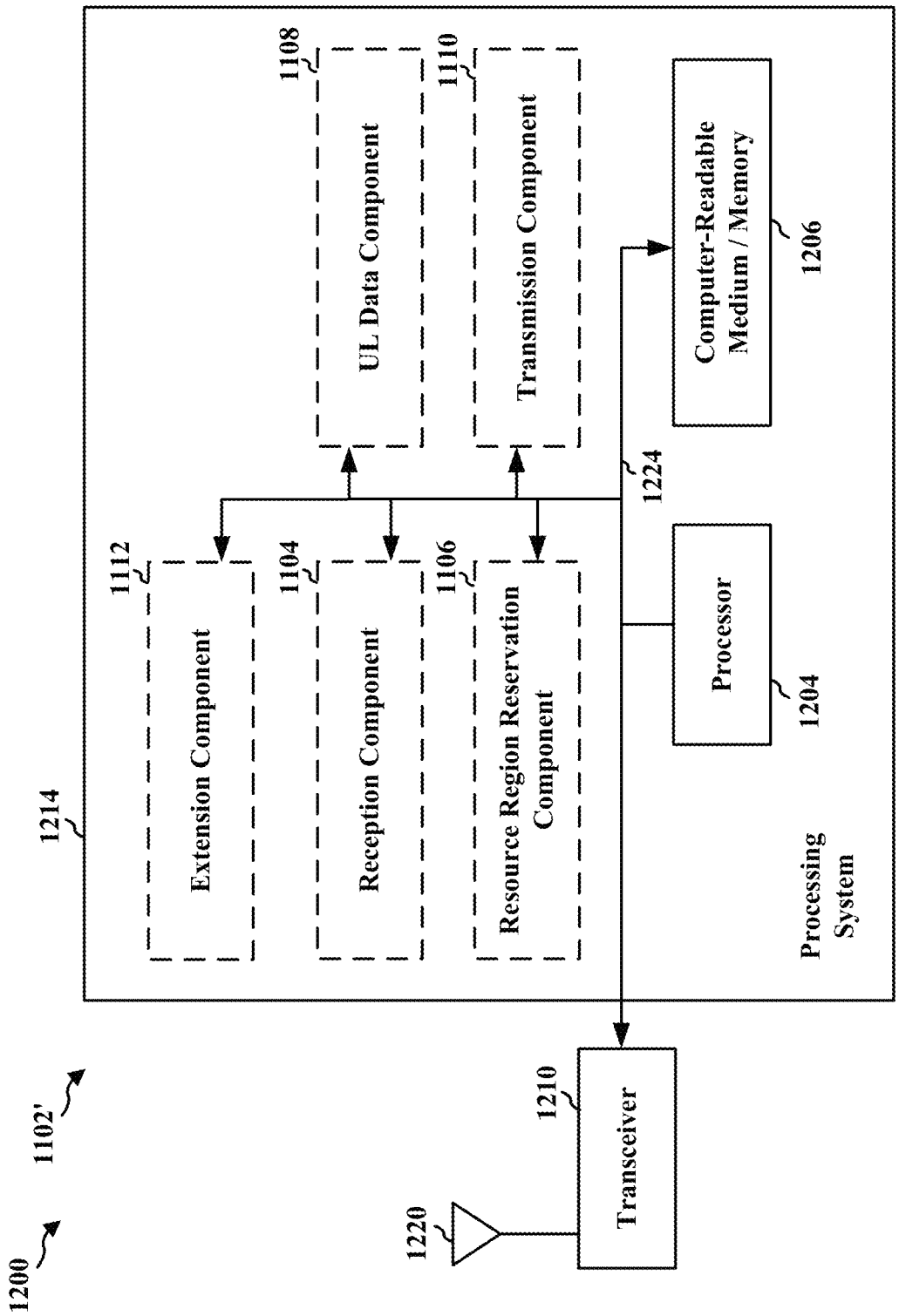
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214, which may be a UE 104, 350, described in connection with previous figures. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1100, 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1100, 1112. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for obtaining resource region reservation information for an ULCB portion of a slot, means for determining a need to transmit data for a data transmission beyond a grant of resources in a ULRB portion of the slot, means for determining whether to extend the data transmission into the ULCB portion based on the resource region reservation information, means for transmitting the UL transmission, means for sending the data transmission in the slot based on a result of the determining, means for receiving a semi-static configuration, means for receiving an indication for a reserved ULCB resource, and means for receiving a guard band offset. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    obtaining resource region reservation information for a transmission for one or more UEs in an uplink (UL) common burst (ULCB) portion of a slot;
    receiving a grant of resources within a UL regular burst (ULRB) portion of the slot;
    determining a need to transmit a data transmission beyond the grant of resources in the ULRB portion of the slot;
    determining whether to extend the data transmission into the ULCB portion of the slot based on whether an extension of the data transmission into the ULCB portion of the slot would overlap reserved resources indicated by the resource region reservation information; and
    sending the data transmission in the slot based on a result of the determining.

2. The method of claim 1, further comprising:
    determining to refrain from extending the data transmission into the ULCB portion of the slot when at least a portion of the data transmission would overlap the reserved resources as indicated by the resource region reservation information.

3. The method of claim 2, wherein obtaining the resource region reservation information comprises identifying a common resource region reserved for a physical uplink control channel (PUCCH) in the ULCB portion of the slot.

4. The method of claim 2, wherein obtaining the resource region reservation information comprises identifying a common resource region reserved for a Physical Random Access Channel (PRACH) in the ULCB portion of the slot.

5. The method of claim 2, further comprising:
    receiving a semi-static configuration of the resource region reservation information, the semi-static configuration indicating at least one of a physical uplink control channel (PUCCH) resource reservation in the ULCB portion of the slot and a Physical Random Access Channel (PRACH) resource reservation in the ULCB portion of the slot,
    wherein the determining whether to extend the data transmission into the ULCB portion of the slot is based on the semi-static configuration.

6. The method of claim 2, wherein obtaining the resource region reservation information comprises receiving a transmission from a base station indicating a Physical Uplink Shared Channel (PUSCH) region reserved in the ULCB portion of the slot.

7. The method of claim 2, wherein obtaining the resource region reservation information comprises receiving a transmission from a base station indicating a Sounding Reference Signal (SRS) region reserved in the ULCB portion of the slot.

8. The method of claim 2, further comprising:
    receiving an indication for an ULCB resource reserved for at least one of a Physical Uplink Shared Channel (PUSCH) and a Sounding Reference Signal (SRS) region, wherein the determining whether to extend the data transmission into the ULCB portion of the slot based is based on the received indication.

9. The method of claim 2, wherein the resource region reservation information identifies a subband comprising at least one reserved resource block.

10. The method of claim 1, wherein the resource region reservation information for the ULCB portion of the slot is cell-specific.

11. The method of claim 1, wherein the resource region reservation information for the ULCB portion of the slot is UE-specific.

12. The method of claim 1, further comprising:
receiving a guard band offset, wherein the UE determines whether to extend the data transmission into the ULCB portion of the slot further based on the guard band offset.

13. The method of claim 1, further comprising:
determining to refrain from extending the data transmission into the ULCB portion of the slot when a ULRB numerology differs from a ULCB numerology.

14. An apparatus for wireless communication, comprising:
means for obtaining resource region reservation information for a transmission for one or more UEs in an uplink (UL) common burst (ULCB) portion of a slot;
means for receiving a grant of resources within a UL regular burst (ULRB) portion of the slot;
means for determining a need to transmit a data transmission beyond the grant of resources in the ULRB portion of the slot; and
means for determining whether to extend the data transmission into the ULCB portion of the slot based on whether an extension of the data transmission into the ULCB portion of the slot would overlap reserved resources indicated by the resource region reservation information; and
means for sending the data transmission in portions of the slot based on the result of the determining.

15. The apparatus of claim 14, wherein the apparatus determines to refrain from extending the data transmission into the ULCB portion of the slot when at least a portion of the data transmission would overlap the reserved resources as indicated by the resource region reservation information.

16. The apparatus of claim 15, wherein the means for obtaining are configured to receive a semi-static configuration of the resource region reservation information, the semi-static configuration indicating at least one of a physical uplink control channel (PUCCH) resource reservation in the ULCB portion of the slot and a Physical Random Access Channel (PRACH) resource reservation in the ULCB portion of the slot, and
wherein the means for determining are configured to determine whether to extend the data transmission into the ULCB portion of the slot is based on the semi-static configuration.

17. The apparatus of claim 15, wherein the means for obtaining are configured to receive an indication for an ULCB resource reserved for at least one of a Physical Uplink Shared Channel (PUSCH) and a Sounding Reference Signal (SRS) region, and
wherein the means for determining are configured to determine whether to extend the data transmission into the ULCB portion of the slot based is based on the received indication.

18. The apparatus of claim 14, wherein the means for obtaining are configured to receive a guard band offset, wherein the apparatus determines whether to extend the data transmission into the ULCB portion of the slot further based on a guard band offset.

19. An apparatus for wireless communication, comprising:
a memory; and
at least one processor coupled to the memory and configured to:
obtain resource region reservation information for a transmission for one or more UEs in an uplink (UL) common burst (ULCB) portion of a slot;
receive a grant of resources within a UL regular burst (ULRB) portion of the slot;
determine a need to transmit a data transmission beyond the grant of resources in the ULRB portion of the slot; and
determine whether to extend the data transmission into the ULCB portion of the slot based on whether an extension of the data transmission into the ULCB portion of the slot would overlap reserved resources indicated by the resource region reservation information; and
a transmitter configured to transmit the data transmission in the slot based on a result of the determining.

20. The apparatus of claim 19, wherein the apparatus is configured to determine to refrain from extending the data transmission into the ULCB portion of the slot when at a portion of the data transmission would overlap the reserved resources as indicated by the resource region reservation information.

21. The apparatus of claim 20, wherein the resource region reservation information is obtained based on identifying a common resource region reserved for a physical uplink control channel (PUCCH) in the ULCB portion of the slot.

22. The apparatus of claim 20, wherein the resource region reservation information is obtained based on identifying a common resource region reserved for a Physical Random Access Channel (PRACH) in the ULCB portion of the slot.

23. The apparatus of claim 20, wherein the at least one processor is further configured to:
receive a semi-static configuration of the resource region reservation information, the semi-static configuration indicating at least one of a physical uplink control channel (PUCCH) resource reservation in the ULCB portion of the slot and a Physical Random Access Channel (PRACH) resource reservation in the ULCB portion of the slot,
wherein the apparatus is configured to determine whether to extend the data transmission into the ULCB portion of the slot is based on the semi-static configuration.

24. The apparatus of claim 20, wherein the resource region reservation information is obtained based on a transmission from a base station indicating a Physical Uplink Shared Channel (PUSCH) region reserved in the ULCB portion of the slot.

25. The apparatus of claim 20, wherein the resource region reservation information is obtained based on a transmission from a base station indicating a Sounding Reference Signal (SRS) region reserved in the ULCB portion of the slot.

26. The apparatus of claim 20, wherein the at least one processor is further configured to:

receive an indication for an ULCB resource reserved for at least one of a Physical Uplink Shared Channel (PUSCH) and a Sounding Reference Signal (SRS) region, wherein the apparatus is configured to determine whether to extend the data transmission into the ULCB portion of the slot based is based on the received indication.

27. The apparatus of claim 20, wherein the resource region reservation information identifies a subband comprising at least one reserved resource block.

28. The apparatus of claim 19, wherein the at least one processor is further configured to:

receive a guard band offset, wherein the apparatus is configured to determine whether to extend the data transmission into the ULCB portion of the slot further based on a guard band offset.

29. The apparatus of claim 19, wherein the apparatus is configured to determine to refrain from extending the data transmission into the ULCB portion of the slot when a ULRB numerology differs from a ULCB numerology.

30. A non-transitory computer-readable medium storing computer executable code for wireless communication at a user equipment, comprising code to:

obtain resource region reservation information for a transmission for one or more UEs in an uplink (UL) common burst (ULCB) portion of a slot;

receive a grant of resources within a UL regular burst (ULRB) portion of the slot;

determine a need to transmit a data transmission beyond the grant of resources in the ULRB portion of the slot;

determine whether to extend the data transmission into the ULCB portion of the slot based on whether an extension of the data transmission into the ULCB portion of the slot would overlap reserved resources indicated by the resource region reservation information; and transmit the data transmission based on a result of the determining.

* * * * *